(12) United States Patent
Ushiyama et al.

(10) Patent No.: US 10,688,820 B2
(45) Date of Patent: Jun. 23, 2020

(54) PRINTING APPARATUS AND PRINTING METHOD

(71) Applicant: CANON KABUSHIKI KAISHA, Tokyo (JP)

(72) Inventors: Takayuki Ushiyama, Chiba (JP); Keita Ishimi, Yokohama (JP); Rie Takekoshi, Kawasaki (JP); Tatsuo Shimmoto, Tokyo (JP); Masaya Uetsuki, Yokohama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 103 days.

(21) Appl. No.: 15/916,149

(22) Filed: Mar. 8, 2018

(65) Prior Publication Data

US 2018/0257417 A1 Sep. 13, 2018

(30) Foreign Application Priority Data

Mar. 13, 2017 (JP) ................................. 2017-047300

(51) Int. Cl.
*B41M 5/00* (2006.01)
*B41J 11/00* (2006.01)
(Continued)

(52) U.S. Cl.
CPC .......... *B41M 5/0023* (2013.01); *B41J 11/002* (2013.01); *B41J 11/009* (2013.01);
(Continued)

(58) Field of Classification Search
CPC ....... B41J 11/009; B41J 11/002; C09D 11/10; C09D 11/322; C09D 11/38; C09D 11/54;
(Continued)

(56) References Cited

U.S. PATENT DOCUMENTS 7,530,684 B2 * 5/2009 Yamanobe ............. B41J 2/2114
347/100
9,144,998 B2 * 9/2015 Sakurada ............... B41J 2/2132
(Continued)

FOREIGN PATENT DOCUMENTS

JP 2014-012402 A 1/2014

OTHER PUBLICATIONS

Paper and Board—Liquid Absorbability Test Method—Bristow's Method, Japan Tappi Paper Pulp Test Method, Standard No. 51: 2000.

*Primary Examiner* — Thinh H Nguyen
(74) *Attorney, Agent, or Firm* — Canon U.S.A., Inc. IP Division

(57) ABSTRACT

A printing apparatus is operable to eject a plurality of inks having different functions onto any one of a plurality of types of printing medium. The plurality of inks include a first ink containing a coloring material, and a second ink containing a polymer emulsion and substantially no coloring material. The plurality of types of printing medium includes a first printing medium and a second printing medium less permeable to liquid than the first printing medium. When the first printing medium is printed, the first ink is used without using the second ink, and when the second printing medium is printed, both the first and the second ink are used.

21 Claims, 11 Drawing Sheets

(51) Int. Cl.
*B41M 7/00* (2006.01)
*C09D 11/10* (2014.01)
*C09D 11/54* (2014.01)
*C09D 11/322* (2014.01)
*C09D 11/38* (2014.01)

(52) U.S. Cl.
CPC ........ *B41M 5/0047* (2013.01); *B41M 5/0064*
(2013.01); *C09D 11/10* (2013.01); *C09D 11/322* (2013.01); *C09D 11/38* (2013.01);
*C09D 11/54* (2013.01); *B41M 5/0011*
(2013.01); *B41M 5/0017* (2013.01); *B41M 7/009* (2013.01); *B41M 7/0018* (2013.01)

(58) Field of Classification Search
CPC .............. B41M 5/0023; B41M 5/0047; B41M 5/0064; B41M 5/0011; B41M 5/0017; B41M 7/0018; B41M 7/009
See application file for complete search history.

(56) References Cited

U.S. PATENT DOCUMENTS

| | | | | |
|---|---|---|---|---|
| 2009/0304927 A1* | 12/2009 | Kamibayashi | ......... | C09D 11/38 427/258 |
| 2010/0271411 A1* | 10/2010 | Iritani | ................. | B41J 11/009 347/6 |
| 2018/0001669 A1* | 1/2018 | Furukawa | .............. | B41J 11/002 |

\* cited by examiner

FIG. 8A

| Input | | | Output | | | | | |
|---|---|---|---|---|---|---|---|---|
| R | G | B | C | M | Y | K | Em | RCT |
| 0 | 0 | 0 | 0 | 0 | 0 | 255 | 0 | 0 |
| ⋮ | ⋮ | ⋮ | | | ⋮ | | | |
| 255 | 255 | 125 | 0 | 0 | 77 | 0 | 0 | 0 |
| 255 | 255 | 126 | 0 | 0 | 76 | 0 | 0 | 0 |
| 255 | 255 | 127 | 0 | 0 | 74 | 0 | 0 | 0 |
| 255 | 255 | 128 | 0 | 0 | 73 | 0 | 0 | 0 |
| 255 | 255 | 129 | 0 | 0 | 71 | 0 | 0 | 0 |
| 255 | 255 | 130 | 0 | 0 | 70 | 0 | 0 | 0 |
| ⋮ | ⋮ | | | | ⋮ | | | |
| 255 | 255 | 255 | 0 | 0 | 0 | 0 | 0 | 0 |

FIG. 8B

| Input | | | Output | | | | | |
|---|---|---|---|---|---|---|---|---|
| R | G | B | C | M | Y | K | Em | RCT |
| 0 | 0 | 0 | 0 | 0 | 0 | 255 | 128 | 51 |
| ⋮ | ⋮ | | | | ⋮ | | | |
| 255 | 255 | 125 | 0 | 0 | 77 | 0 | 38 | 15 |
| 255 | 255 | 126 | 0 | 0 | 76 | 0 | 38 | 15 |
| 255 | 255 | 127 | 0 | 0 | 74 | 0 | 37 | 15 |
| 255 | 255 | 128 | 0 | 0 | 73 | 0 | 36 | 14 |
| 255 | 255 | 129 | 0 | 0 | 71 | 0 | 35 | 14 |
| 255 | 255 | 130 | 0 | 0 | 70 | 0 | 35 | 14 |
| ⋮ | ⋮ | | | | ⋮ | | | |
| 255 | 255 | 255 | 0 | 0 | 0 | 0 | 0 | 0 |

FIG. 10A  FIG. 10B  FIG. 10C  FIG. 10D
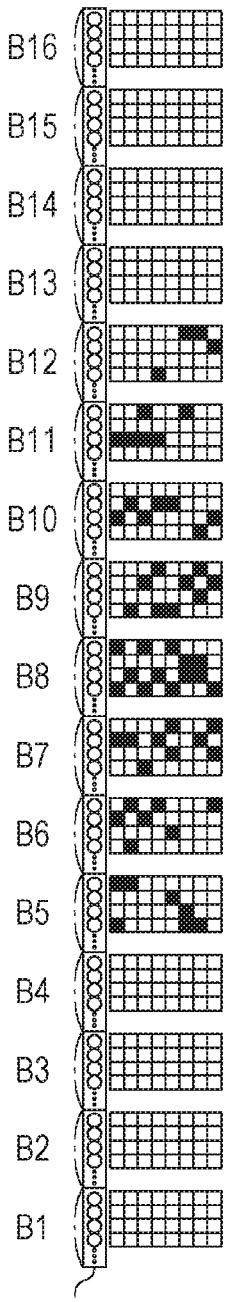 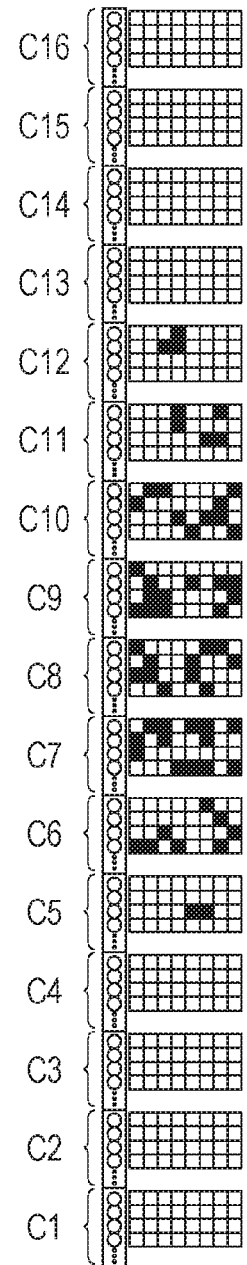 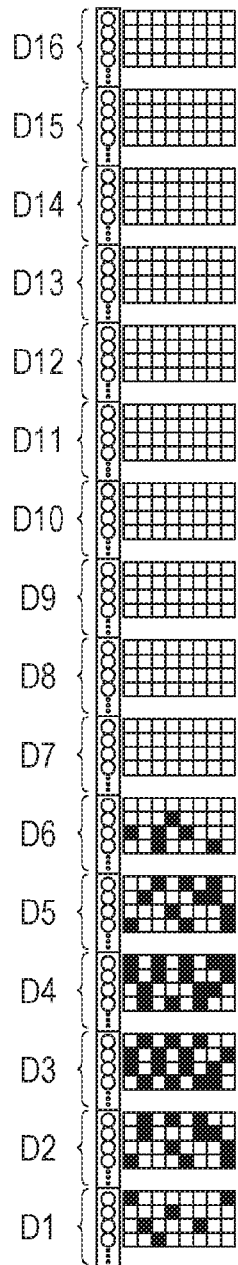 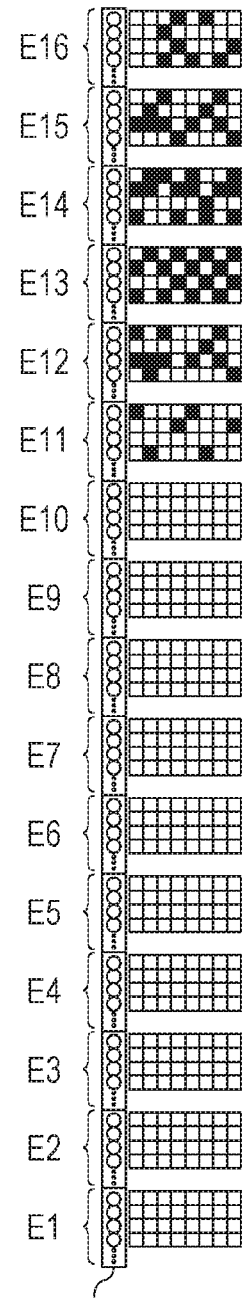
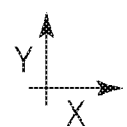 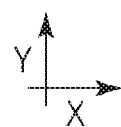 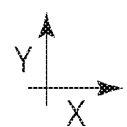 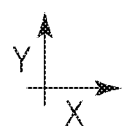

FIG. 11A
FIG. 11B
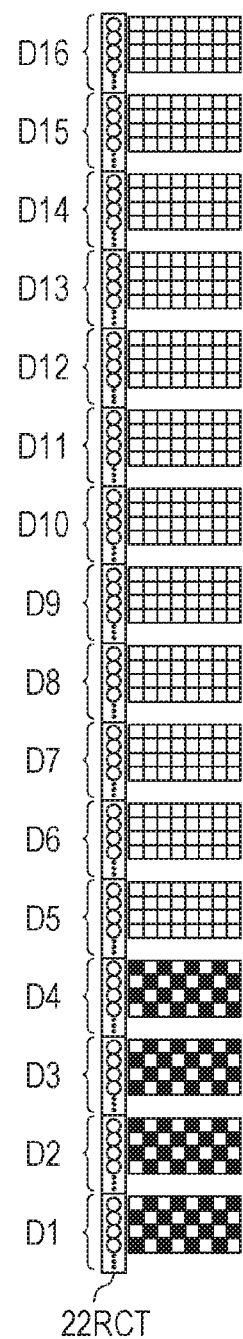
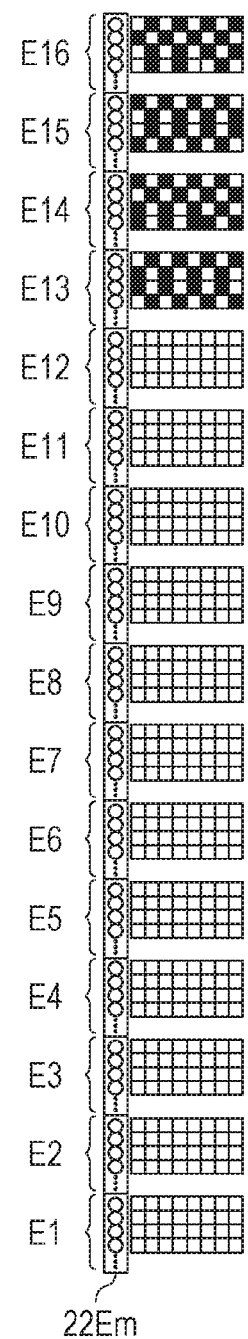
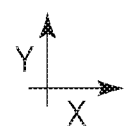
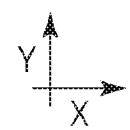

PRINTING APPARATUS AND PRINTING METHOD

BACKGROUND OF THE INVENTION

Field of the Invention

The present disclosure relates to a printing apparatus and a printing method.

Description of the Related Art

There has been known a printing apparatus operable to print an image on a printing medium by a printing head ejecting an ink while traversing (scanning) the printing medium in a direction (scanning direction). This type of printing apparatus has been increasingly used to produce printed articles, or printed matter, for various applications, and various types of ink and printing medium are used accordingly.

Japanese Patent Laid-Open No. 2014-012402 discloses a printing medium including a polyvinyl chloride layer or the like that is resistant to water, light and rubbing, and an ink containing a pigment and a polymer emulsion. This prior art document also discloses a method using the printing medium and the ink in which the ink dropped on the printing medium is heated so that the particles of the polymer emulsion can melt to form a film over the surface of the printing medium and thus fix the image. According to this method, the printed image has high fastness to water, light and rubbing, accordingly being durable even when exhibited outdoors.

The method disclosed in Japanese Patent Laid-Open No. 2014-012402, however, does not always provide satisfactory image quality, for example, when indoor display print is formed.

The reason is probably as below. First, the solids content in the ink increases. While the solids contained in normal are only pigment, the ink disclosed in Japanese Patent Laid-Open No. 2014-012402 contains a polymer emulsion with a relatively large proportion in addition to the pigment. Accordingly, the content of solids (pigment and particles of the polymer emulsion) in one droplet of the ink on the printing medium increases. This can cause clogging of ejection openings when the ink is ejected. Although clogging may be reduced by increasing the diameter of the election openings to increase the amount of ink to be ejected through each opening, this increases the diameter of each ink droplet, and the resulting image has a reduced definition and a reduced glossiness.

Furthermore, if the ink is not sufficiently heated, the particles of the polymer emulsion in the ink cannot completely melt to form a film and some of the emulsion particles remain in the layer of the ink. The residual emulsion particles cause the surface of the printed image to roughen. Consequently, the glossiness of the image may be reduced.

Thus, the method disclosed in Japanese Patent Laid-Open No. 2014-012402 may not be able to provide satisfactorily high quality printed articles for indoor display. If an ink not containing a polymer emulsion is used, such a problem does not occur, but a film of polymer emulsion coating the surface of the printing medium cannot be formed. Such an ink therefore cannot provide printed articles having water, light and rub fastness sufficient for outdoor display.

SUMMARY OF THE INVENTION

Accordingly, the present disclosure provides a printing apparatus and a printing method that can produce both printed articles having high image quality and printed articles having fastness to water, light, and rubbing.

According to an aspect of the present disclosure, there is provided a printing apparatus including an ink ejecting device configured to eject a plurality of inks having different functions onto any one of a plurality of types of printing medium. The plurality of inks includes a first ink containing a coloring material, and a second ink containing a polymer emulsion and substantially no coloring material. The plurality of types of printing medium include a first printing medium and a second printing medium less permeable to liquid than the first printing medium. When the first printing medium is printed, the first ink is used without using the second ink, and when the second printing medium is printed, both the first and the second ink are used.

Further features will become apparent from the following description of exemplary embodiments with reference to the attached drawings.

BRIEF DESCRIPTION OF THE DRAWINGS

FIGS. 8A and 8B are each a lookup table used in an embodiment of the present disclosure.

FIGS. 10A to 10D are illustrative representations of mask patterns used in an embodiment of the present disclosure.

FIGS. 11A and 11B are illustrative representations of mask patterns used in an embodiment of the present disclosure.

DESCRIPTION OF THE EMBODIMENTS

Exemplary embodiments of the present disclosure will now be described with reference to the drawings.

First Embodiment

Figure 1:
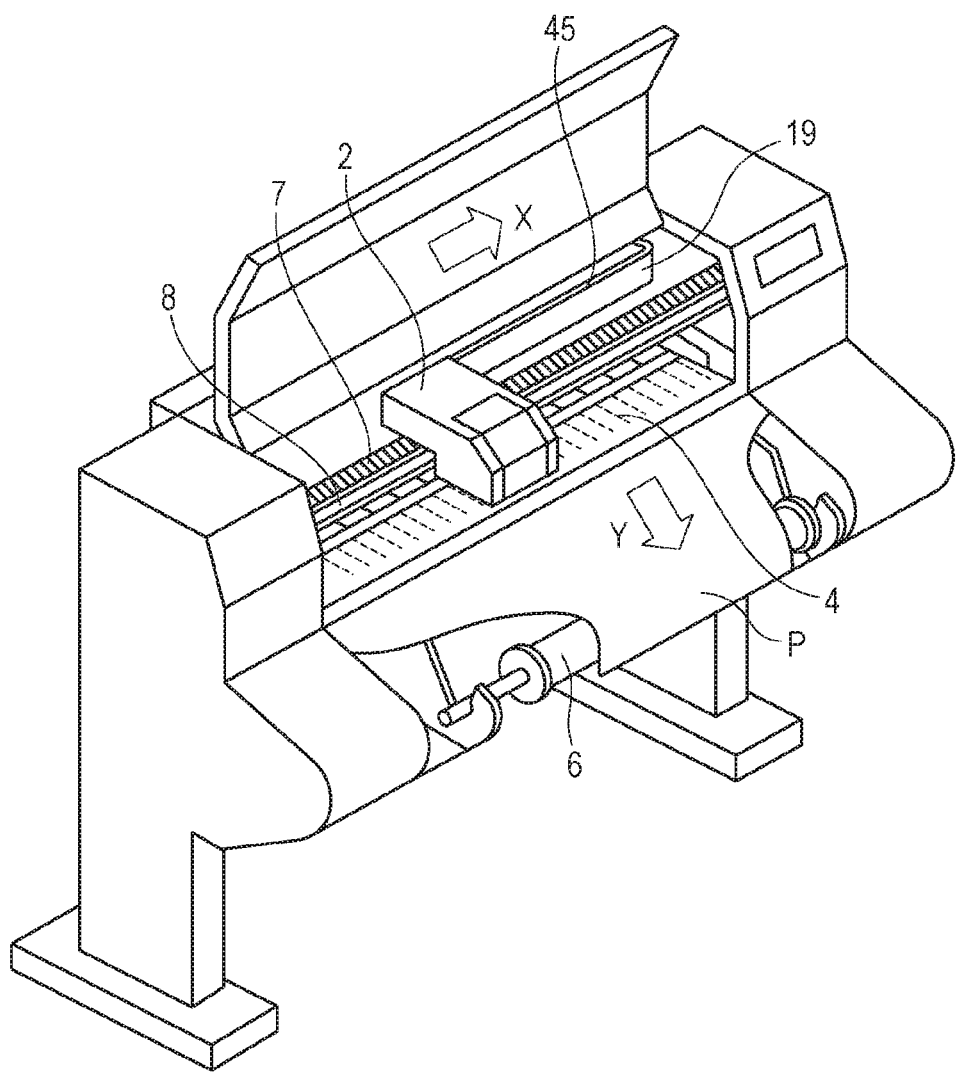
FIG. 1 is a perspective view of a printing apparatus according to an embodiment of the present disclosure.

FIG. 1 depicts the appearance of an ink jet printing apparatus (hereinafter also referred to as the printing apparatus or the printer) according to an embodiment of the present disclosure. This printing apparatus is what is called a serial scan printer, which prints an image on a printing medium P being conveyed in a direction Y (conveying direction) while the printing head traverses (scans) in a direction X (scanning direction) perpendicular to the direction Y.

The structure of this ink jet printing apparatus and the operation thereof during printing will now be roughly described with reference to FIG. 1. First, a printing, medium P is conveyed in the Y direction from a spool 6 holding the printing medium P by a conveying roller driven with a gear by a conveying motor (not shown). A carriage unit 2 is reciprocally moved to travers (scan) the printing medium P along a guide shaft 8 extending in the X direction by a carriage motor (not shown). The printing apparatus causes a printing head (described herein later) mountable to the carriage unit 2 to eject an ink through ejection openings at a timing based on a positional signal converted by an encoder 7, thus printing a band having a predetermined width corresponding to the arrangement of the ejection openings. In the present embodiment, the carriage unit 2 traverses at a scanning speed of 40 inches per second, and the printing head ejects the ink at a resolution of 600 dpi (1/600 inches). Then, the printing medium P is conveyed and printed in the next band with the predetermined width. The carriage unit 2 may traverse at a scanning speed of more than 40 inches per second.

The driving force from the carriage motor to the carriage unit 2 may be transmitted by a carriage belt. As an alternative to the carriage belt, a mechanism may be used which includes, for example, a leadscrew extending in the X direction and rotated by the carriage motor, and an engaging member provided for the carriage unit 2 and engaged with the groove of the leadscrew.

The printing medium P is conveyed, with being pinched between a feed roller and a pinch roller, to a printing position (region that the printing head scans) on a platen 4. Normally, in a quiescent state, the face of the printing head is provided with a cap. The cap is removed before starting printing so that the printing head or the carriage unit 2 can scan. Then, on storing data of one scanning operation in a buffer, the carriage motor drives the carriage unit 2 for scanning. Printing is thus performed. The printing apparatus of the present embodiment performs printing in such a manner that an image is printed in a unit area (1/n band) of the printing medium P by a of times (n times) of scanning of the printing head. This is what is called multi-pass printing.

The printing apparatus includes a heater (not shown) operable to heat a clear emulsion ink (described herein later) to cure the ink into a coating film. The heater may be disposed over the printing head so as to heat the underlying printing medium on which an image has been printed. Alternatively, the heater may be disposed under the platen 4 so as to heat the overlying printing medium on which an image has been printed.

Desirably, the heating temperature of the heater is higher than or equal to the minimum film forming temperature (hereinafter abbreviated to MFT) of the polymer emulsion. Since the heating of the heater is intended to evaporate most of the liquid component, such as solvent, in the ink, the ink jet printing apparatus is configured to have a temperature distribution, in a direction in which the printing medium is conveyed, ensuring a heating time sufficient to apply an energy required to evaporate most of the liquid component. The term MFT refers to the lowest temperature at which polymer fine particles being heated melt to form a continuous polymer film. MFT can be easily measured with a minimum film forming temperature measuring instrument. The minimum film forming temperature measuring instrument measures the temperature at which an ink containing a polymer emulsion spread over a thermally conductive metal plate having a temperature gradient starts forming a film as the MFT.

In some embodiments, the heating temperature of the heater may be in the range of 50° C. to 120° C. in view of the use of the ink and the printing media described herein later. If the heating temperature is less than 50° C., the solvent in the ink is likely to remain in the ink. If the heating temperature is 120° C. or more, the printing media is likely to be deformed.

Figure 2:
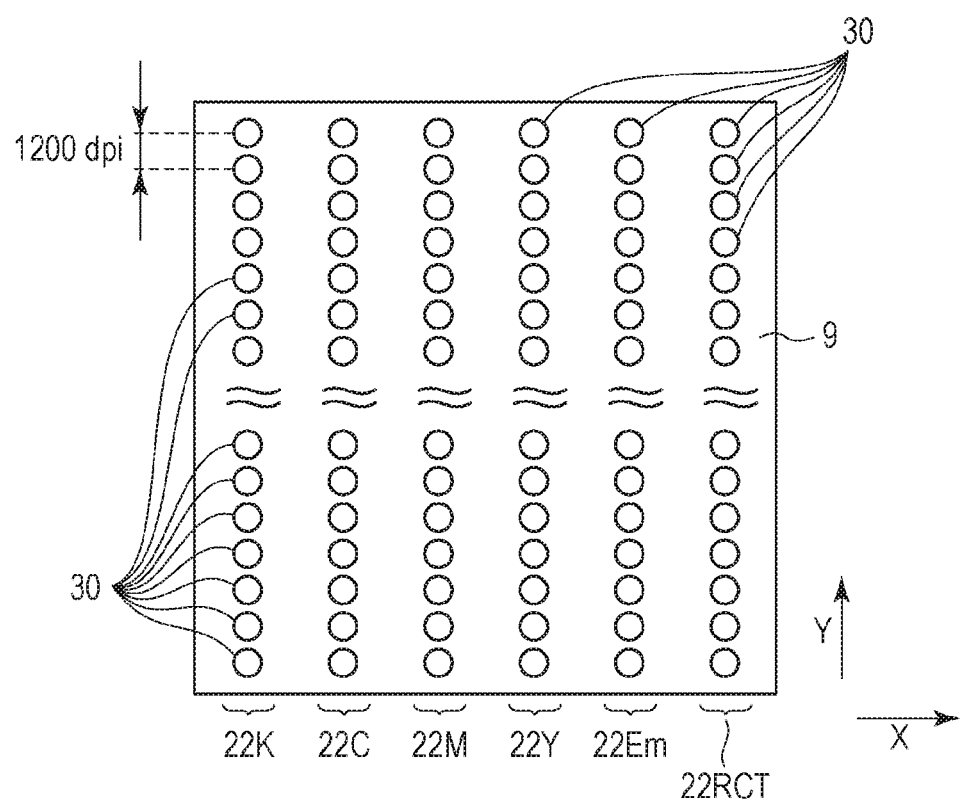
FIG. 2 is a schematic view of a printing head used in an embodiment of the present disclosure.

FIG. 2 depicts a printing head 9 of the printing apparatus according to the present embodiment. The printing head 9 has a line 22K of ejection openings 30 through which a black ink (K) is ejected, a line 22C of ejection openings 30 through which a cyan ink (C) is ejected, a line 22M of ejection openings 30 through which a magenta ink (M) is ejected, and a line 22Y of ejection openings 30 through which a yellow ink (Y) is ejected. The black ink (K), the cyan ink (C), the magenta ink (M), and the yellow ink (Y) each contain a pigment as a coloring material. Such an ink may be hereinafter referred to as a pigment ink.

Also, the printing head 9 has a line 22RCT of ejection openings 30 through which a reaction liquid (RCT) containing no coloring material is ejected. The reaction liquid will come into contact with inks containing a coloring material and is intended to improve image quality. More specifically, it is intended to prevent what is called bleeding in the image, which is caused by inks containing respective coloring material attracting each other when coming into contact with each other on the printing medium.

The printing head 9 further has a line 22Em of ejection openings 30 through which a clear emulsion ink (Em) is ejected. The clear emulsion ink contains a polymer emulsion, but no coloring material. The clear emulsion ink (hereinafter referred to as clear Em in some cases), after being applied onto the printing medium, forms a film acting to improve at least one of the rub fastness, water fastness and light fastness of the printed image when heated.

In the printing head 9, the ejection opening lines 22K, 22C, 22M, 22Y, 22Em, and 22RCT are arranged in this order in the X direction from left to right. Each of the election opening lines 22K, 22C, 22M, 22Y, 22Em, and 22RCT has 1280 ejection openings 30 aligned in the Y direction (aligning direction) with a density of 1200 dpi. In the present embodiment, the amount of ink ejected at one time through one ejection opening 30 is about 4.5 pL.

Each of the ejection opening lines 22K, 22C, 22M, 22Y, 22Em, and 22RCT communicates with a corresponding ink tank (not shown) that stores the corresponding ink, and the ink is fed from the ink tank. The printing head 9 and the ink tank may be integrated into one body or may be separable.

Printing Control System

Figure 3:
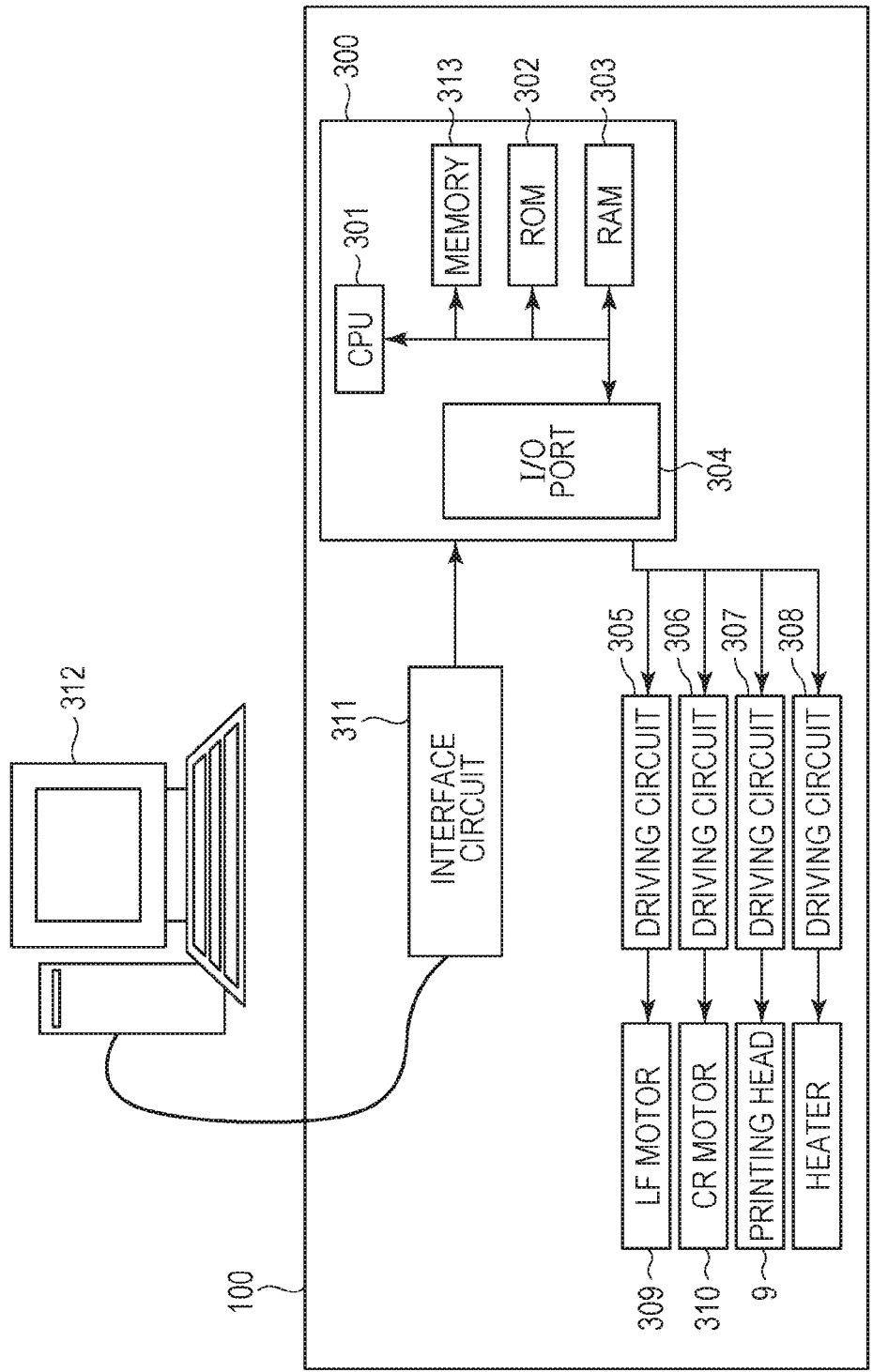
FIG. 3 is a block diagram of the structure of a printing control system according to an embodiment of the present disclosure.

FIG. 3 is a block diagram schematically illustrating the structure of a printing control system in a printing apparatus 100 according to the present embodiment. A main control section 300 includes a CPU 301 operable to execute processing operation, such as arithmetic calculation, selection, discrimination, and control, and printing operation; a ROM 302 storing a control program and the like to be executed by the CPU 301; a RAM 303 used as a buffer or the like of printing data, and an input/output port 304. A memory device 313 stores mask patterns or the like that will be described herein later. The input/output. (I/O) port 304 is connected to driving circuits 305, 306, 307, and 308 respectively for a conveying motor (LF motor) 309, a carriage motor (CR motor) 310, a printing head 9, and an actuator of the heater. The main control section 300 is connected to a PC 312 acting as a host computer via an interface circuit 311.

Multi-Pass Printing

In the present embodiment, an image is printed by a multi-pass printing technique that is performed by applying the inks to a unit area of the printing medium by a plurality of times of scanning operation. In the present embodiment, each unit area is printed by 6 times of scanning. Accordingly, 6 mask patterns corresponding to the 6 times of scanning operation, as will be described herein later, are used for the multi-pass printing. In the present embodiment, the same mask patterns are used for each of the inks. The order of applying inks in a plurality of times of scanning is not particularly limited.

Figure 4:
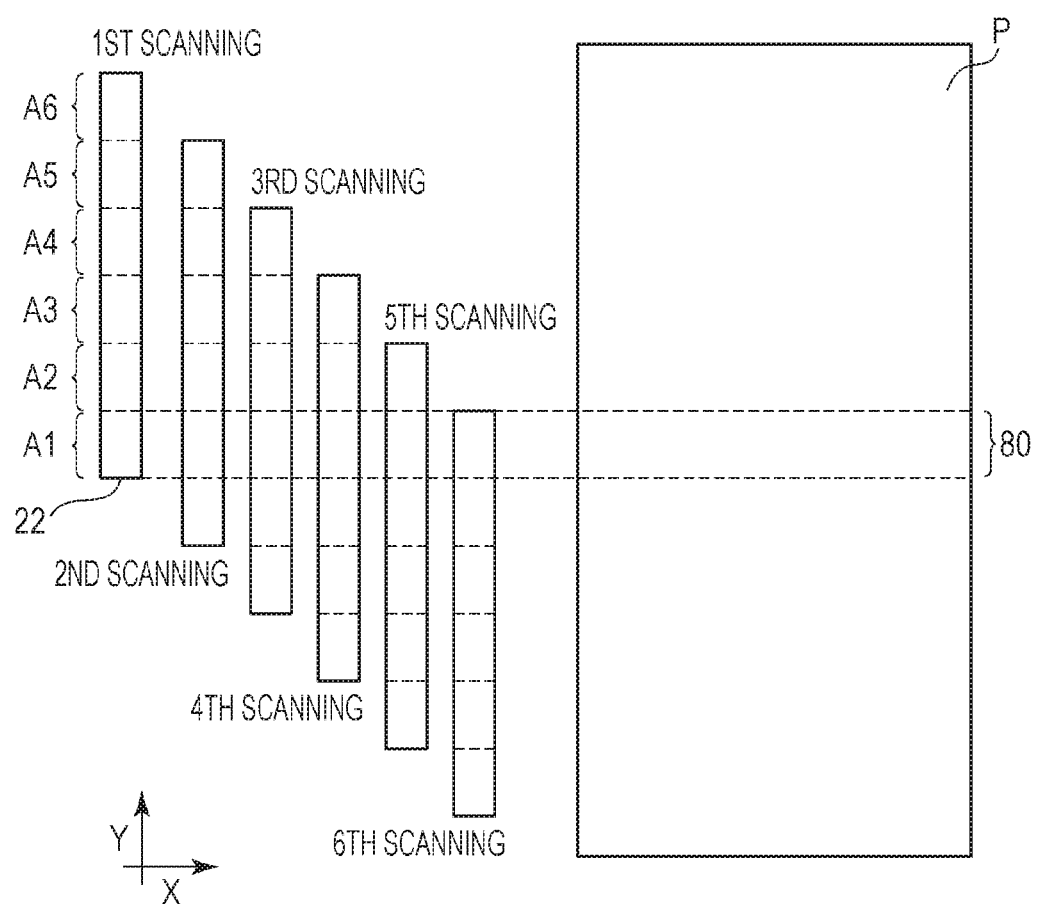
FIG. 4 is an illustrative representation of multi-pass printing applied to an embodiment of the present disclosure.

FIG. 4 is a representation of the multi-pass printing used in the present embodiment. In the present embodiment, each line 22 of the ejection openings is divided in the Y direction into 6 groups A1 to A6 of ejection openings, and the inks are ejected through the ejection openings in the corresponding group in each of the 6 times of scanning for the unit area. Although in the actual printing, the printing medium P is conveyed in the Y direction every time of scanning of the printing head 9, FIG. 4 illustrates for simplification as if the printing head 9 moves in the direction opposite to the Y direction.

In the first scanning, the printing head 9 moves in a state where group A1 of the ejection opening lines 22 corresponds to a unit area 80 on the printing medium P, and an ink is ejected onto the unit area 80 through the ejection openings in group A1 according to the printing data for the first scanning. After the first scanning is completed, the printing medium P is conveyed a distance corresponding to the one ejection opening group in the Y direction. Then, in the second scanning, the ink is ejected onto the unit area 80 through the ejection openings in group A2 according to the printing data for the second scanning. Subsequently, the ink is ejected in the third to the sixth scanning through the ejection openings in the respective groups A3 to A6 onto the unit area 80 by alternations between the conveyance of the printing medium and the ink ejection from the printing head. Thus, multi-pass printing for the unit area 80 is completed.

Figure 5:
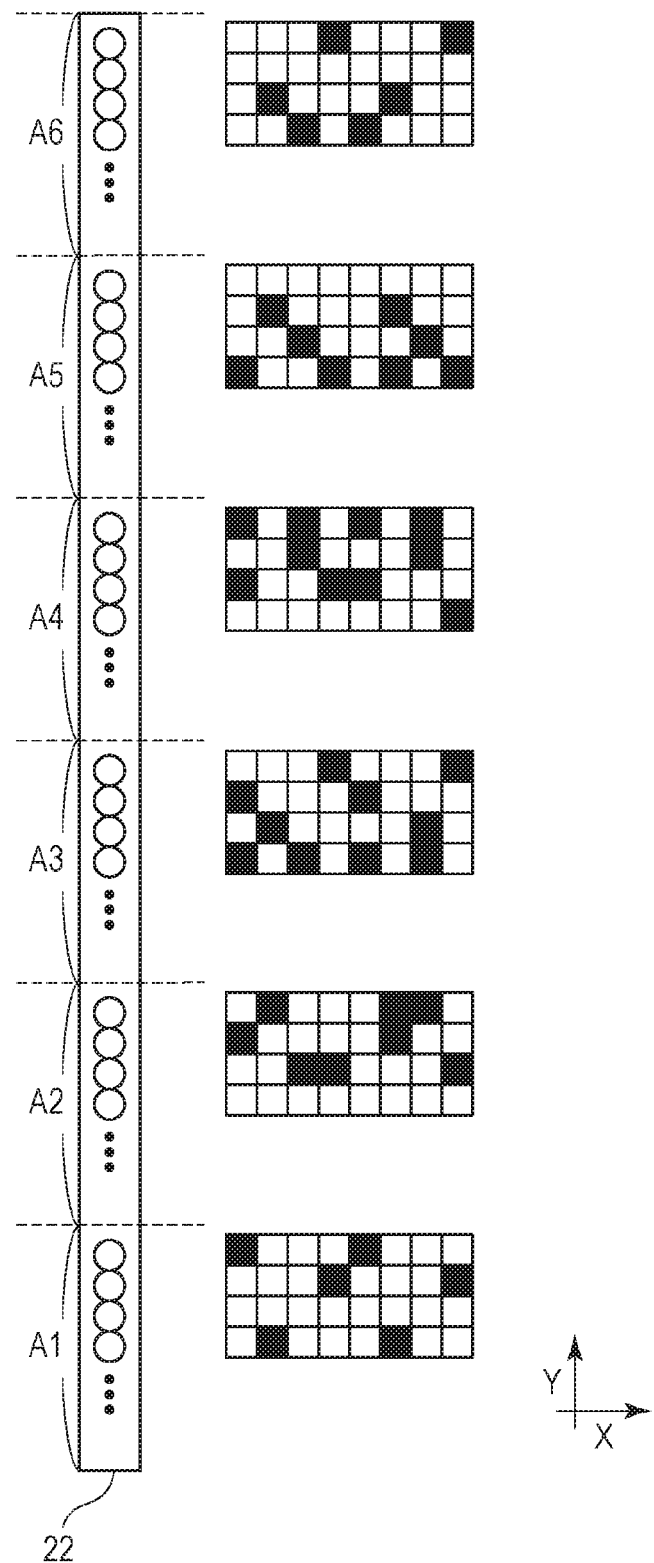
FIG. 5 is an illustrative representation of mask patterns used in an embodiment of the present disclosure.

FIG. 5 is an illustrative representation of a set of the 6 mask patterns used in the present embodiment. In the patterns shown in FIG. 5, the black solid portions represent pixels that accept the ejection of ink determined by the quantized data (hereinafter referred to as printable pixels), and the white blank portions represent pixels that do not accept ejection of ink even though the ejection is determined by the quantized data (hereinafter referred to as non-printable pixels). The mask patterns shown in FIG. 5 each have a size corresponding to 4 pixels×8 pixels. By repeatedly using these mask patterns in the X and the Y direction, all the quantized data for each unit area are distributed.

The 6 mask patterns shown in FIG. 5 each have 32 pixels (4 pixels×8 pixels), and the total number of the printable pixels in the 6 mask patterns is 48 pixels. The printable percentage, that is, the percentage of the total number of printable pixels in the patterns shown in FIG. 5 to the number of pixels of one mask pattern is 150% (=48/32×100).

For the mask pattern for each time of scanning, the mask pattern for the first scanning (using ejection opening group A1) and the mask pattern for the sixth scanning (using ejection opening group A6) each have 6 printable pixels. Hence, the printable percentages of the mask patterns for the first and the sixth scanning are each about 20% (=6/32×100).

The mask pattern for the second scanning (using ejection opening group A2) and the mask pattern for the fifth scanning (using ejection opening group A5) each have 8 printable pixels. Hence, the printable percentages of the mask patterns for the second and the fifth scanning are each about 25% (=8/32×100).

The mask pattern for the third scanning (using ejection opening group A3) and the mask pattern for the fourth scanning (using ejection opening group A4) each have 10 printable pixels. Hence, the printable percentages of the mask patterns for the third and the fourth scanning are each about 30% (=10/32×100).

Compositions of Inks

The compositions of the inks according to the present embodiment will now be described. In the following description, "part(s)" and "I" are on a mass basis unless otherwise specified.

1. Compositional Conditions of Inks

The inks of the present embodiment are adjusted so that the acid dissociation constant pKa of the reactive component in the reaction liquid RCT is lower than the pKa of the water-soluble resin in each of the pigment inks C, M, Y, and K and higher than the pKa of the water-soluble resin in the polymer emulsion Em.

An acid dissociation constant pKa is a quantitative measure of the strength of an acid and is represented by using a negative common logarithm for the hydrogen-releasing dissociation reaction of the acid. In general, the lower the pKa, the stronger the acid.

In the present embodiment, it is beneficial that the reactive component in the reaction liquid has such an acid strength as to keep the fine particles of the polymer emulsion dispersed in the clear emulsion ink and destroy the dispersion of the pigment in the pigment inks.

In the present embodiment, the polymer emulsion and the pigments are each dispersed with a resin. More specifically, a water-soluble resin having an anionic group is attached to the surfaces of the particles of the pigments and polymer emulsion. In these states, the three pKa of the anionic group of the water-soluble resin attached to the pigment, the anionic group of the water-soluble resin attached to the polymer emulsion, and the reactive component are adjusted as described below. In the following description, the pKa of the anionic group of the water-soluble resin attached to the pigment is represented as PigpKa; the pKa of the anionic group of the water-soluble resin attached to the polymer emulsion is represented as EmpKa; and the pKa of the reactive component is represented as AcpKa.

In the present embodiment, it is beneficial that the pigment in each ink is allowed to react with the reactive component in the reaction liquid from the viewpoint of reducing bleeding. Accordingly, a substance having a higher acid strength than the anionic group of the water-soluble resin attached to the pigment is used as the reactive component. Hence, PigpKa>AcpKa holds true.

Also, it is beneficial that the reactive component has a lower acid strength than the anionic group of the water-soluble resin attached to the polymer emulsion so that the polymer emulsion does not react with the reactive component, from the viewpoint of preventing the polymer emulsion from interfering with the full reaction of the pigment with the reactive component. Hence, AcpKa>EmpKa holds true.

Thus, it is beneficial that the inks used in the present embodiment satisfy, the relationship: PigpKa>AcpKa>EmpKa. When these inks satisfying this relationship come into contact with each other, the pigment is likely to precipitate, and the polymer emulsion is unlikely to precipitate.

Accordingly, in the present embodiment, an appropriate combination of the reactive component and each of the anionic groups of the water-soluble resins of the pigment and the polymer emulsion is selected.

Details will now be described. For example, glutaric acid is used as the reactive component. Glutaric acid has a pKa of about 4.3. If a dispersion contains a sulfonate ($-SO_3$), the sulfonate is less reactive with the reactive component or glutaric acid because sulfonic acid has a pKa of about 3.0. Thus, the polymer emulsion used in the present embodiment is in a state of dispersion containing a sulfonate so that the polymer emulsion is less reactive with the reaction liquid.

If a dispersion contains a carboxylate (—COO), the carboxylate is reactive with glutaric acid because acetic acid has a pKa of about 4.8. Accordingly, in the present embodiment, the pigment is in a state of dispersion containing a carboxylate from the viewpoint of enhancing the reactivity with the reaction liquid.

If the pigment and the polymer emulsion contain plural types of anionic groups, EmpKa and PigpKa can be determined by the anionic group mainly involved in the dispersion. For example, if a polymer emulsion dispersed with a mixture of a sulfonate and a carboxylate does not flocculate when mixed with an organic acid having a pKa of about 4.0, it can be determined that the sulfonate is mainly involved in the dispersion.

2. Compositions of Inks

The compositions of the inks will be described in detail below. The pigment inks (C, M, Y, and K), the reaction liquid (RCT), and the clear emulsion ink (Em) each contain a water-soluble organic solvent. The water-soluble organic solvent may have a boiling point in the range of 150° C. to 300° C. in view of how much the face of the printing head 9 can be wetted and kept wet. Also, in view of the function of helping polymer fine particles to form a coating film and of the swelling and dissolution of the printing medium coated with the polymer coating film, the water-soluble organic solvent may be selected from among ketones, such as acetone and cyclohexanone; pyrene glycol derivatives, such as tetraethylene glycol dimethyl ether; and heterocyclic compounds having a lactam structure, such as N-methylpyrrolidone and 2-pyrrolidone. The content of the water-soluble organic solvent may be in the range of 3% by mass to 30% by mass from the view of easy ejection. Examples of the water-soluble organic solvent include alkyl alcohols having a carbon number of 1 to 4, such as methyl alcohol, ethyl alcohol, n-propyl alcohol, isopropyl alcohol, n-butyl alcohol, sec-butyl alcohol, and tort-butyl alcohol; amides, such as dimethylformamide and dimethylacetamide; ketones or hydroxy ketones, such as acetone and diacetone alcohol; ethers, such as tetrahydrofuran and dioxane; polyalkylene glycols, such as polyethylene glycol and polypropylene glycol; ethylene glycol or alkylene glycols whose alkylene group has a carbon number of 2 to 6, such propylene glycol, butylene glycol, triethylene glycol, 1,2,6-hexanetriol, thiodiglycol, hexylene glycol, and diethylene glycol; lower alkyl ether acetates, such as polyethylene glycol monomethyl acetate; glycerin; lower alkyl ethers, such as ethylene glycol monomethyl (or monoethyl) ether, diethylene glycol methyl (or ethyl) ether, and triethylene glycol monomethyl (or monoethyl) ether; polyhydric alcohols, such as trimethylolpropane and trimethylolethane; and N-methyl-2-pyrrolidone, 2-pyrrolidone, and 1,3-dimethyl-2-imidazolidinone. One of these water-soluble organic solvents may be used singly, or a mixture of two or more of these organic solvents may be used. Water may be deionized water. The water-soluble organic solvent content in the reaction liquid (RCT) is not particularly limited. The pigment inks (C, M, Y, and K) and the clear emulsion ink (Em) may optionally contain a surfactant, an antifoaming agent, a preservative, a fungicide, and the like in addition to necessary components to impart a desired physical property.

Each of the pigment inks (C, M, Y, and K), the reaction liquid (RCT), and the clear emulsion ink (Em) contains a surfactant. The surfactant is intended to act as a penetration agent to help the ink penetrate the ink jet printing medium. As the surfactant content is increased, the surface tension of the ink decreases, and, accordingly, the ink can more easily wet and penetrate the printing medium. In the present embodiment, a small amount of acetylene glycol EO adduct or the like is added as the surfactant to each ink to adjust the surface tension of the ink so that the surface tension of each ink becomes 30 dyn/cm or less with a difference of 2 dyn/cm or less from the surface tension of the other inks. More specifically, the surface tension of each ink is adjusted to about 28 dyn/cm to about 30 dyn/cm. For measuring surface tension, an automatic surface tensiometer CBVP-Z (manufactured by Kyowa Interface Science) may be used. Any other instrument may be used as long as it can measure the surface tension of the inks.

Each of the inks of the present embodiment is stably alkaline and has a pH of 8.5 to 9.5. From the viewpoint of preventing the components or members of the printing apparatus and head that will come in contact with the inks from dissolving or being damaged and preventing decrease in solubility of the resin involved in dispersion in the ink, pH of each ink may be in the range of 7.0 to 10.0. The pH may be measured with a pH meter model F-52 manufactured by Horiba. Any other instrument may be used as long as it can measure the pH of the inks.

2-1 Pigment Inks

For simplicity in description, only the cyan (C) and magenta (M) inks of the pigment inks (black (K), cyan (C), magenta (M), and yellow (Y)) used in the present embodiment will be described.

2-1-1 Magenta Ink

Preparation of Dispersion Liquid

First, an AB block copolymer having an acid value of 300 and a number average molecular weight of 2500 is produced from benzyl acrylate and methacrylic acid in a conventional process. Then, the reaction system is neutralized with an aqueous solution of potassium hydroxide and diluted with ion exchanged water to yield a 50% by mass homogeneous aqueous solution of the polymer.

Then, 100 g of the polymer solution is mixed with 100 g of C.I. Pigment. Red 122 and 300 g of ion-exchanged water, and the mixture is mechanically stirred for 0.5 hour.

Subsequently, the resulting mixture is passed through the interaction chamber of a microfluidizer five times at a liquid pressure of about 70 MPa.

The dispersion liquid thus prepared is centrifuged (at 12,000 rpm for 20 minutes) to remove undispersed components including course particles, thus yielding a magenta dispersion liquid. The magenta dispersion liquid contains 10% by mass of pigment and 5% by mass of dispersant.

Preparation of Ink

For preparing a magenta ink, the magenta dispersion liquid is mixed with the following ingredients to a desired concentration. After sufficiently mixing the ingredients with stirring, the mixture is subjected to pressure filtration through a microfilter of 2.5 μm in pore size (produced by Fujifilm Corporation) to yield a pigment ink containing 4% by mass of the pigment and 2% by mass of the dispersant.

Magenta dispersion liquid prepared above: 40 parts
2-Pyrrolidone: 5 parts
2-Methyl-1,3-propanediol: 15 parts
Acetylene glycol EO adduct (produced by Kawaken Fine Chemicals): 0.5 part
Ion-exchanged water: balance 2-1-2 Cyan Ink Preparation of Dispersion Liquid First, an AB block copolymer having an acid value of 250 and a number average molecular weight of 3000 is produced from benzyl acrylate and methacrylic acid in a conventional process. Then, the reaction system is neutralized with an aqueous solution of potassium hydroxide and diluted with ion exchanged water to yield a 50% by mass homogeneous aqueous solution of the polymer.

Then, 180 g of the polymer solution is mixed with 100 g of C.I. Pigment Blue 15:3 and 220 g of ion-exchanged water, and the mixture is mechanically stirred for 0.5 hour.

Subsequently, the resulting mixture is passed through the interaction chamber of a microfluidizer five times at a liquid pressure of about 70 MPa.

The dispersion liquid thus prepared is centrifuged (at 12,000 rpm for 20 minutes) to remove undispersed components including course particles, thus yielding a cyan dispersion liquid. The cyan dispersion liquid contains 10% by mass of pigment and 10% by mass of dispersant.

Preparation of Ink

For preparing a cyan ink, the cyan dispersion liquid is mixed with the following ingredients to a desired concentration. After sufficiently mixing the ingredients with stirring, the mixture is subjected to pressure filtration Through a microfilter of 2.5 µm in pore size (produced by Fujifilm Corporation) to yield a pigment ink containing 4% by mass of the pigment and 2% by mass of the dispersant.

Cyan dispersion liquid prepared above: 20 parts

2-Pyrrolidone: 5 parts

2-Methyl-1,3-propanediol: 15 parts

Acetylene glycol EO adduct (produced by Kawaken Fine Chemicals): 0.5 part

Ion-exchanged water: balance 2-2 Reaction Liquid

The reaction liquid used in the present embodiment contains a reactive component that can react with the pigment in each ink to flocculate the particles of the pigment or gels the pigment. More specifically when the reaction liquid is mixed with an ink containing a pigment stably dispersed or dissolved in a water-soluble medium by the function of an ionic group, the reactive component destroys the stable dispersion of the pigment. In the present embodiment, glutaric acid is used as the reactive component, as described above.

However, the reactive component is not necessarily glutaric acid, and, in another embodiment, any other water-soluble organic acid may be used. Examples of such an organic acid include oxalic acid, polyacrylic acid, formic acid, acetic acid, propionic acid, glycolic acid, malonic acid, malic acid, maleic acid, ascorbic acid, levulinic acid, succinic acid, glutamic acid, glutamic acid, fumaric acid, citric acid, tartaric acid, lactic acid, pyrrolidonecarboxylic acid, pyronecarboxylic acid, pyrrolecarboxylic acid, furancarboxylic acid, pyridinecarboxylic acid, coumalic acid, thiophenecarboxylic acid, nicotinic acid, oxysuccinic acid, and dioxysuccinic acid. The organic acid content may be in the range of 3.0% by mass to 90.0% by mass, beneficially in the range of 5.0% by mass to 70.0% by mass, relative to the total mass of the reaction liquid.

Preparation of Ink

In the present embodiment, glutaric acid (produced by Wako Pure Chemical Industries) is used as the organic acid, or reactive component, and the following ingredients are mixed together to yield a reaction liquid:

Glutaric acid: 3 parts

2-Pyrrolidone: 5 parts

2-Methyl-1,3-propanediol: 15 parts

Acetylene glycol EO adduct (produced by Kawaken Fine Chemicals): 0.5 part.

Ion-exchanged water: balance 2-3. Clear Emulsion Ink

The clear emulsion ink used in the present embodiment contains a polymer emulsion but does not contain any coloring material.

The term "polymer emulsion" mentioned herein refers to polymer fine particles dispersed in water. Examples of such polymer fine particles include acrylic resin fine particles synthesized by emulsion polymerization of a monomer such as alkyl (meth) acrylate ester or (meth)acrylic acid alkylamide, styrene-acrylic resin fine particles synthesized by emulsion polymerization of an alkyl (meth) acrylate ester or a (meth)acrylic acid alkylamide with a styrene monomer, polyethylene resin fine particles, polypropylene resin fine particles, polyurethane resin fine particles, and styrene-butadiene resin fine particles. Other types of polymer fine particles may also be used such as core-shell polymer fine particles each including a core and a shell that are made of polymers having different compositions, or polymer fine particles produced by emulsion polymerization using acrylic resin fine particles synthesized in advance as seeds for controlling the particle size. Also, hybrid polymer fine particles may be used which are produced by chemically combining different types of resin fine particles, for example, combining acrylic resin fine particles and urethane resin fine particles.

The "polymer fine particles dispersed in water", or polymer emulsion, may be in a state of fine particles produced by homopolymerization or copolymerization of one or more monomers having a dissociable group, that is, in a state of dispersion of self-dispersible polymer fine particles. The dissociable group in this instance may be a sulfo group, as described above. Other monomers having a dissociable group may be acrylic acid, methacrylic acid, or the like. The "polymer fine particles dispersed in water" may be what is called an emulsifier-dispersed polymer fine particle dispersion prepared by dispersing polymer fine particles with an emulsifier. The emulsifier may be a substance having an anionic charge, irrespective of whether it has a low molecular weight or a high molecular weight.

The dissociable group is not necessarily the sulfo group as long as AcpKa>EmpKa holds true. For example, the dissociable group may be the phosphate group.

Any polymer containing a sulfo group, including generally used natural or synthetic polymers and a novel polymer developed for the clear emulsion ink, may be used as the polymer component of the polymer fine particles without particular limitation. From the viewpoint of general use and easy design of the function of the polymer fine particles, a homopolymer or a copolymer of one or more monomers having a radically polymerizable unsaturated bond, similar to acrylic resin or styrene-acrylic resin may be used.

The monomer having a radically polymerizable unsaturated bond may be a hydrophilic radically polymerizable unsaturated monomer containing sulfo group, and examples thereof include styrenesulfonic acid, sulfonic acid-2-propylacrylamide, acrylic acid-2-ethyl sulfonate, methacrylic acid-2-ethyl sulfonate, butylacrylamide sulfonic acid, and salts thereof.

The hydrophilic radically polymerizable unsaturated monomer may be used in combination with any other monomer not containing a sulfo group, and examples of such a monomer include monomers having a carboxy group, such as acrylic acid, methacrylic acid, crotonic acid, ethacrylic acid, propylacrylic acid, isopropylacrylic acid, itaconic acid, and fumaric acid, and salts thereof; and monomers having a phosphonate group, such as methacrylic acid 2-ehyl phosphonate and acrylic acid 2-ethyl phosphonate.

Hydrophobic monomers may be used, and examples thereof include (meth) acrylic acid esters, such as methyl acrylate, ethyl acrylate, isopropyl acrylate, n-propyl acrylate, n-butyl acrylate, t-butyl acrylate, benzyl acrylate, methyl methacrylate, ethyl methacrylate, isopropyl methacrylate, n-propyl methacrylate, n-butyl methacrylate, isobutyl methacrylate, t-butyl methacrylate, tridecyl methacrylate, and benzyl methacrylate; styrene-based monomers, such as styrene, α-methylstyrene, o-methylstyrene, m-methylstyrene, p-methylstyrene, and p-tert-butylstyrene; itaconic acid esters, such as benzyl itaconate; maleic acid esters, such as dimethyl maleate; fumaric acid esters, such as dimethyl fumarate; and acrylonitrile and vinyl acetate. Known or novel oligomers or macromonomers may be used without particular limitation.

Since the radically polymerizable monomer used in the present embodiment will be subjected to aqueous precipitation polymerization to form polymer fine particles having a sulfo group, the radically polymerizable monomer may be selected according to the desired properties of the polymer fine particles. Hence, it may be a known radically polymerizable monomer or a novel monomer developed for the clear emulsion ink of the present embodiment.

In the present embodiment, the polymer of the polymer fine particles having a sulfo group may be a copolymer of monomers including at least one of the above-cited hydrophilic monomers having a sulfo group and at least one of the above-cited hydrophobic monomers. This is beneficial in providing an ink in a good dispersion state and an ink set that can produce high-quality printed articles. For producing the polymer fine particles, desired properties of the polymer fine particles can be controlled by appropriately selecting some factors, such as the polymerization initiator to be used and the content thereof and the monomers forming the copolymer and the proportions thereof.

Although the radial polymerization is performed under conditions appropriately selected depending on the polymerization initiator, dispersant, and the properties of the monomers, the reaction temperature may be 100° C. or less, such as in the range of 40° C. to 80° C. The reaction time may be 1 hour or more, such as in the range of 6 hours to 30 hours. The stirring speed during the reaction may be in the range of 50 rpm to 500 rpm, such as 150 rpm to 400 rpm.

When at least one hydrophobic monomer and at least one hydrophilic monomer having a sulfo group are polymerized to form polymer fine particles having a sulfo group, the monomers may be dropped in an aqueous dispersion containing an aqueous radical polymerization initiator. It is beneficial to keep the proportions of the monomers constant from the viewpoint of uniformly producing desired polymer fine particles having a sulfo group from a mixture of monomers having different natures such as the mixture of the hydrophobic monomer and the hydrophilic monomer. If a mixture of the monomers is added to a polymerization system in a much higher amount than the amount of monomers that will be consumed in a certain time for the polymerization, the polymerization tends to proceed in such a manner that only a specific monomer is precedently polymerized and consumed, followed by polymerization of the rest of the monomers. In this instance, the resulting sulfo group-containing polymer fine particles have nonuniform properties.

In the case of a polymer component containing a hydrophilic monomer component with a high content, the polymer may not be able to precipitate due to the high hydrophilicity thereof, thus remaining as a water-soluble component in the reaction system without forming sulfo group-containing polymer fine particles. The polymer fine particles may be synthesized by a known method.

In the present embodiment, the aqueous dispersion is prepared by dispersing insoluble polymer fine particles in water with a water-soluble resin acting as a dispersant. The resulting polymer fine particles, which have a sulfo group, can be stably dispersed. The preparation of the clear emulsion ink will now be described in detail.

Preparation of Ink

The dispersion of the polymer fine particles is prepared as below.

First, 28.5 parts of hydrophobic monomer methyl methacrylate and a mixture of 4.3 parts of hydrophilic monomer sodium p-styrenesulfonate and 30 parts of water are gradually dropped into a mixture of 0.05 parts of polymerization initiator potassium persulfate and 30 parts of water, and a polymerization is performed for 5 hours with stirring with a motor at 70° C. in a nitrogen atmosphere.

The resulting polymer fine particles are mixed with the following ingredients so as to have a content of 10% in the resulting ink, and the mixture is subjected to pressure filtration through a microfilter of 2.5 µm in pore size (produced by Fujifilm Corporation) to yield a clear emulsion ink.

2-Pyrrolidone: 5 parts
2-Methyl-1,3-propanediol: 15 parts
Acetylene glycol EO adduct (produced by Kawaken Fine Chemicals): 0.5 part
Ion-exchanged water: balance Printing Medium The printing apparatus according to the present embodiment can print a plurality of type of printing media. The printing media that may be printed in the present embodiment is classified into two types: permeable printing media that allow water in the ink to pass through; and poorly permeable printing media that are unlikely to allow water to pass through.

Exemplary poorly permeable printing media include printing media having a plastic uppermost layer over a substrate, printing media having no ink-receiving layer, and sheets, films and banners made of glass, YUPO, or plastics. The plastics applied to the printing media include polyvinyl chloride, polyethylene terephthalate, polycarbonate, polystyrene, polyurethane, polyethylene, and polypropylene. Poorly permeable printing media are resistant to water, light and abrasion and are therefore used, in general, for printed articles for outdoor display.

Permeable printing media have an ink-receiving layer over the substrate, and examples thereof include plain paper and glossy paper. Permeable printing media, which are less resistant to water, light and rubbing than poorly permeable printing media, can absorb ink into the ink-receiving layer and thus enable printed images to exhibit high color development and high quality. Accordingly, permeable printing media are generally used for producing printed articles for indoor display.

The permeability of printing media may be examined by Bristow's Method specified in Standard. No. 51 of JAPAN TAPPI, "Test Method for Liquid Absorption of Paper and Paperboard" (in Japanese). In the Bristow's method, a predetermined amount of an ink is poured into a container having an aperture slit having a predetermined size and is then brought into contact through the aperture with a printing medium formed into a rectangular shape and wound around a disk. Thus, the ink is transferred onto the printing medium to form an ink band, and the area (or length) of this ink band is measured. From the measured area of the ink band, the amount per unit area (mL·m$^{-2}$) of ink transferred for one second is calculated. In the present embodiment, when the amount of ink transferred (amount of ink absorption) for 30 msec$^{1/2}$ measured by Bristow's method is 10 mL·m$^{-2}$ or more, the printing medium is considered to be permeable; when it is lower than 10 mL·m$^{-2}$, the printing medium is considered to be poorly permeable.

Image Processing and Printing Control

As described above, the printing apparatus of the present embodiment can eject the pigment inks, the reaction liquid, and the clear emulsion ink and can print two type of printing media: permeable printing media and poorly permeable printing media.

In this instance, it should be determined which type of printed article, fastness-oriented printed article (resistant to water, light and rubbing) or image quality-oriented printed article, will be produced. In the present embodiment, which the user focuses on, fastness to water, light and rubbing or image quality, is determined according to the type of printing medium to be printed.

More specifically, if a poorly permeable printing medium, which is generally used for outdoor display, is printed, it is determined that the user focuses on fastness to water, light and rubbing. Poorly permeable printing media are generally smooth and, accordingly, unlikely to allow pigment to be fixed thereto. In the present embodiment, accordingly, the clear emulsion ink is used for printing poorly permeable printing media, in addition to the pigment ink(s), and the inks on the printing medium are heated with a heater so that the particles of the polymer emulsion melt to form a film over the surface of the printed image.

If a permeable printing medium, which is generally used for indoor display, is printed, it is determined that the user focuses on image quality rather than fastness to water, light and rubbing. If the clear emulsion ink is applied to a permeable printing medium in spite of not focusing on fastness, the polymer emulsion does not appropriately form a film, and this film degrades the glossiness of the resulting image. In the present embodiment, accordingly, the clear emulsion ink is not used for printing permeable printing media. In this instance, it is not necessary to form a film of the polymer emulsion. Accordingly, heating with a heater is not performed.

For the reaction liquid, it is ejected for printing on poorly permeable printing media, but not ejected for printing permeable printing media. As described above, the printing apparatus of the present embodiment can eject the reaction liquid to reduce bleeding. If an ink is applied onto a poorly permeable printing medium, the ink is kept in a droplet form on the printing medium for a relatively long time. Accordingly, the droplet is likely to be in contact with other droplets for a long time, causing bleeding. In the present embodiment, when a poorly permeable printing medium is printed, the reaction liquid is applied in addition to the pigment ink and the clear emulsion ink. On the other hand, when a permeable printing medium, which has an ink-receiving layer as described above, is printed, the applied ink permeates the ink-receiving layer and fixes in this layer in a relatively short time. Since the period the ink on the permeable printing medium is kept in a droplet form is short, bleeding is unlikely to occur on the permeable printing medium. In the present embodiment, the reaction liquid is therefore not applied for printing permeable printing media.

Table 1 shows which inks are used for printing permeable printing media and poorly permeable printing media and whether or not the respective printing media are heated with a heater.

TABLE 1

| | Use the ink? | | | |
|---|---|---|---|---|
| | Pigment ink | Clear Em ink | Reaction liquid | Heater |
| Poorly permeable media | Yes | Yes | Yes | Used |
| Permeable media | Yes | No | No | Not used |

In the present embodiment, the combinations of inks to be used are switched depending on the type of printing medium. More specifically, when poorly permeable printing media used for printed articles for outdoor display are printed, the pigment inks, the clear emulsion ink, and the reaction liquid are used. Also, when permeable printing media used for printed articles for indoor display are printed, only the pigment inks are used without using the clear emulsion ink or the reaction liquid.

In operation for such printing control, the printing apparatus of the present embodiment receives information on the type of printing medium to be printed, and then selects one of the printing modes: poorly permeable printing medium printing media and permeable printing medium printing mode. Then, images are formed in a printing control process according to the selected printing mode.

Figure 6:
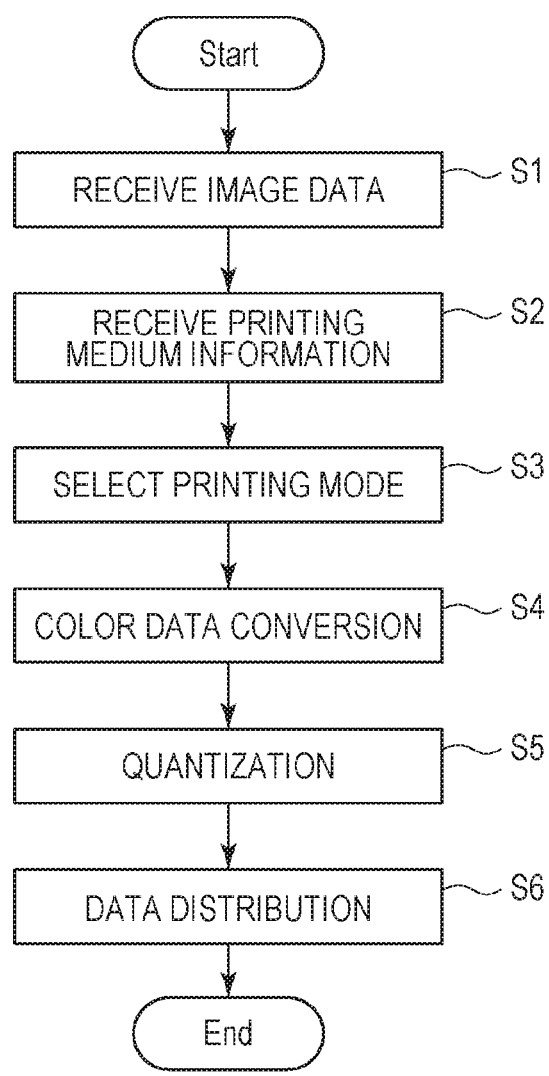
FIG. 6 is a flow chart of a data processing process used in an embodiment of the present disclosure.

Referring to FIG. 6, this is a flow chart of printing data generation (image formation) executed by the CPU according to the control program used in the present embodiment.

First, in step S1, the printing apparatus 100 receives RGB image data inputted from the host computer, or the PC 312.

Then, in step S2, the printing apparatus 100 receives information on the type of printing medium to be printed. In the present embodiment, the user selects the printing medium to be printed, and the printing apparatus receives the information on the type of printing medium according to the user input.

Figure 7:
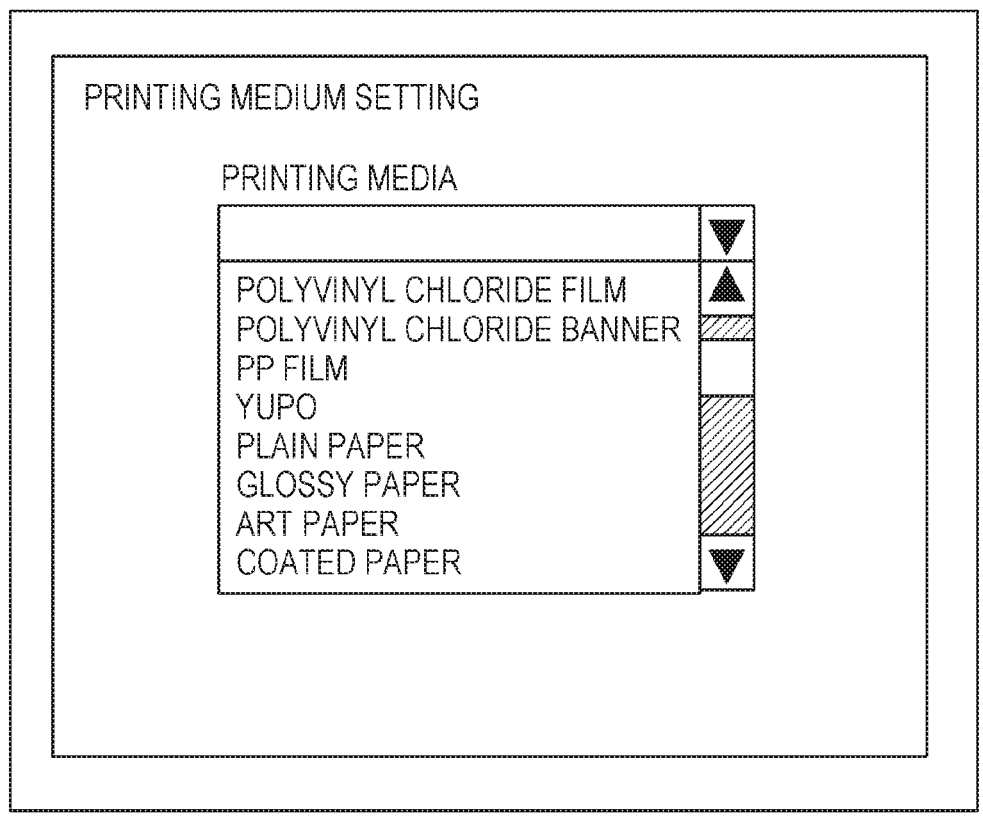
FIG. 7 is a representation of a user interface for selecting a printing medium used in an embodiment of the present disclosure.

FIG. 7 is a schematic representation of a screen (user interface, UI) that appears on the display of the PC 312 when the user inputs information on the type of printing medium. In FIG. 7, eight printing media: POLYVINYL CHLORIDE FILM, POLYVINYL BANNER, PP FILM, YUPO, PLAIN PAPER, GLOSSY PAPER, ART PAPER, and COATED PAPER are shown. The user selects a printing medium to be printed from a plurality of printing medium including these eight printing media. Then, the information on the selected printing medium is inputted to the printing apparatus 100 via the PC 312. Thus, the printing apparatus 100 receives the information on the type of printing medium in step S2.

Although, in the present embodiment, the user inputs information on the type of printing medium via a user interface, the printing apparatus in an embodiment may include a sensor capable of determining the type of printing medium so that the printing apparatus can automatically receive information on the type of printing medium based on the determination of the sensor.

In step S3, one of the printing modes: the mode for printing poorly permeable printing media and the mode for printing permeable printing media, is selected as the mode to be executed according to the information on the printing medium received in step S2.

POLYVINYL CHLORIDE FILM and POLYVINYL CHLORIDE BANNER of the eight printing media each have a polyvinyl chloride layer over the substrate. PP FILM is a polypropylene film, and YUPO is a synthetic paper made of polypropylene. These printing media are poorly permeable and superior in resistance to water, light and abrasion and are generally used for printed articles for outdoor display. Hence, if the printing apparatus receives information indicating one of polyvinyl chloride film, polyvinyl chloride banner, PP film, and Yupo as information on the type of printing medium to be printed, the mode for printing poorly permeable printing media is selected in step S3.

On the other hand, plain paper and glossy paper are generally permeable. Art paper and coated paper are coated with a film and are less permeable than plain paper and glossy paper but is more permeable than the above-described poorly permeable printing media. Hence, if the printing apparatus receives the information indicating any one of PLAIN PAPER, glossy paper, ART PAPER, and COATED PAPER as information of the type of printing medium to be printed, the mode for printing permeable printing media is selected in step S3.

Subsequently, in step S4, color conversion is executed for converting image date including RGB values designated by RGB signals into multivalued data corresponding to the respective inks. This color conversion generates multivalued data represented by 8 bits, 256 values (0 to 255) defining the tone of each of the inks. For this color conversion, a lookup table (LUT) is used which specifies the correspondence among the RGB values before conversion, the CMYK values indicated by CMYK signals corresponding to the colors of the respective inks after conversion, the Em value indicated by the signal of the clear emulsion ink, and the RCT value indicated by the signal of the reaction liquid.

In the present embodiment, the color conversion uses one of the LUTs corresponding to the printing mode selected in step S3. The LUTs used in step S3 will be described herein later.

Then, in step S5, the multivalued data are quantized. In this quantization, quantized data are generated which are represented by 1 bit (2 values) and determine whether or not each of the inks is elected to the corresponding pixel. The quantization may be performed by a variety of methods, such as error diffusion or dithering.

Subsequently, in step S6, the quantized data are distributed to a plurality of times of scanning operation for multi-pass printing of the printing head as described with reference to FIGS. 4 and 5. Through this data distribution, printing data are generated which are represented by 1 bit (2 values) and determine whether or not each of the inks is elected to the corresponding pixel by each scanning operation for the unit area of the printing medium. In the present embodiment, the same mask patterns as those described with reference to FIG. 5 are applied to the quantized data for each ink.

Although in the present embodiment, the CPU 301 the printing apparatus 100 executes all the steps S1 to S6, other embodiments may be implemented. For example, in an embodiment, all the steps S1 to S6 may be executed in the PC 312. In another embodiment, the steps up to the color conversion (S4) may be executed in the PC 312, and the rest, or the steps from the quantization (S5), may be executed in the printing apparatus 100.

FIG. 8A depicts a part of a LUT used in the permeable printing media printing mode. FIG. 8B depicts a part of a LUT used in the poorly permeable printing media printing mode. For simplicity, FIGS. 8A and 8B show the portion representing pure black ((R, G, B)=(0, 0, 0)), the portion representing pure white ((R, G, B)=(255, 255, 255)), and a part of the portion of yellow line represented by only the yellow ink.

Figure 9A:
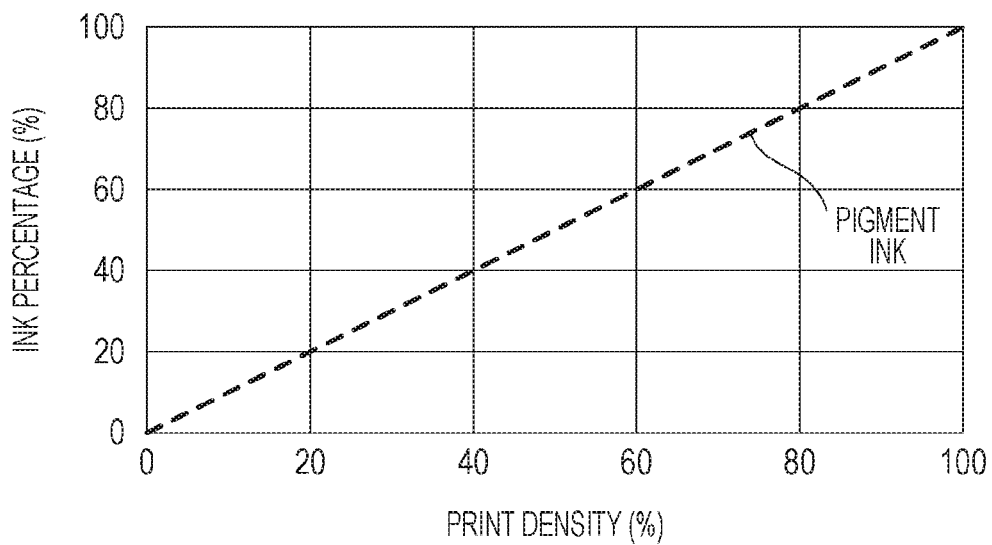
FIGS. 9A and 9B are each a plot illustrating the relationship between print density and the percentage of ink applied.
Figure 9B:
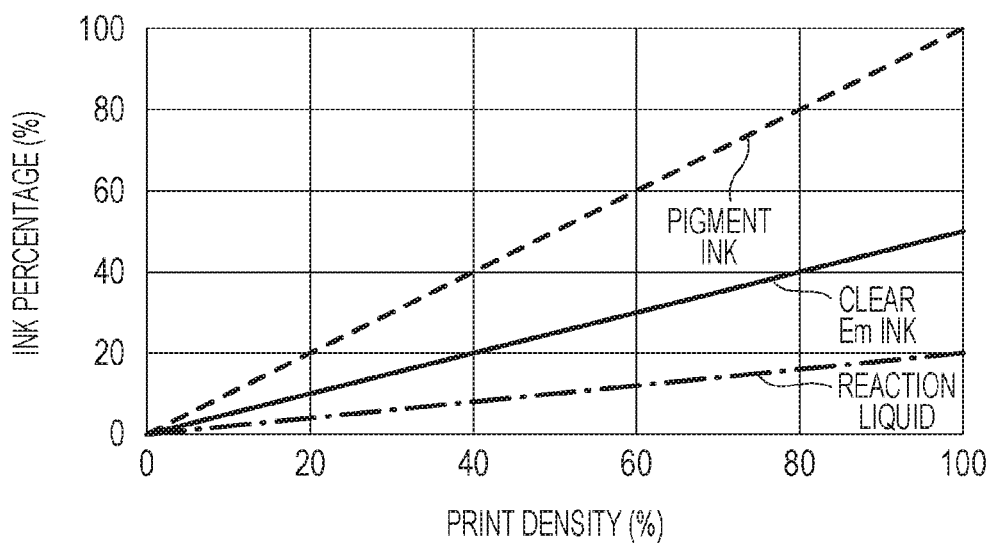

FIG. 9A is a plot of the percentage of applied inks corresponding to print density when the LUT shown in FIG. 8A is used, and FIG. 9B is a plot of the percentage of applied inks corresponding to print density when the LUT shown in FIG. 8B is used.

FIG. 8A shows that the Em and RCT values are each 0 irrespective of the RGB values in the permeable printing media printing mode. Thus, the multivalued data are generated so that the clear emulsion ink and the reaction liquid are not ejected irrespective of the RGB values. Accordingly, this mode uses only the pigment inks independently of the print density, as shown in FIG. 9A.

On the other hand, in the poorly permeable printing media printing mode, the Em and RCT values, as well as CMYK values, are outputted according to the RGB values, as shown in FIG. 8B. More specifically, the signal values of the CMYK values, the Em value, and the RCT value have a proportion of about 4:2:1. For example, when (R, G, B) is (255, 255, 130), (C, M, Y, K) is (0, 0, 70, 0), and (Em, RCT) is (35, 14). Hence, the Em value is about a half of the total (70) of the CMYK values, and the RCT value is about a quarter of the total of the CMYK values. Thus, as the print density is increased, the percentage of the pigment inks increases, and the percentage of the clear emulsion ink also increases with a proportion of ½ to the pigment inks, as shown in FIG. 9B. Also, the percentage of the applied reaction liquid increases with a proportion of ¼ to the pigment inks.

As described above, the concentration of the polymer emulsion in the clear emulsion ink is 10%, and the concentration of the pigment in each pigment ink (magenta ink, cyan ink) is 4%. Since the ratio of the percentage of applied pigment inks to the percentage of applied clear emulsion ink is 2:1, the mass ratio of the pigments to the polymer emulsion is 4:5.

As described above, in the present embodiment, combinations of inks to be used are switched by changing LUTs depending on to the printing mode. More specifically, for producing a printed article having fastness to water, light and rubbing, inks of three types: pigment inks, clear emulsion ink, and reaction liquid, are ejected onto a poorly permeable printing medium. On the other hand, when an image quality-oriented printed article is produced, only pigment inks are ejected onto a permeable printing medium. The printing apparatus of the present embodiment is thus controlled.

Second Embodiment

In the first embodiment, the inks are applied in random order with the same mask patterns, without specifying the order of ink application.

In contrast to the first embodiment, in a second embodiment, when poorly permeable printing media are printed, different sets of mask patterns are applied to quantized data corresponding to each of the pigment inks, the reaction liquid and the clear emulsion ink so that the inks are applied to a unit area in a specific order.

In the following description, the same description as in the first embodiment will be omitted.

In the present embodiment, each unit area is printed by 16 times of scanning.

FIG. 10A to 10D are illustrative representations of mask patterns used in the present embodiment. FIGS. 10A, 10B, 10C, and 10D depict mask patterns corresponding to the line 220 of ejection openings for the cyan ink, the line 22M of ejection openings for the magenta ink, the line 22RCT of ejection openings for the reaction liquid, and the line 22Em of ejection openings for the clear emulsion ink, respectively.

As shown in FIG. 10A, among the mask patterns for the ejection opening groups B1 to B16 of cyan ink ejection opening line 220 corresponding to the first to the 16th scanning, the mask patterns for the intermediate ejection opening groups B5 to B12 corresponding to the 5th to the 12th scanning have printable pixels. The ejection opening groups B1 to B4 for the first to the fourth scanning, and the ejection opening groups B13 to B16 for the 13th to the 16th scanning do not have any printable pixel. Thus, the cyan ink is ejected in the 5th to the 12th of the 16 times of scanning.

Similarly, among the mask patterns for the ejection opening groups C1 to C16 of the magenta ink ejection opening line 22M corresponding to the first to the 16th scanning, the mask patterns for the ejection opening groups C5 to C12 corresponding to the 5th to the 12th scanning have printable pixels, as shown in FIG. 10B. Thus, the magenta ink is also ejected in the 5th to the 12th of the 16 times of scanning.

For the ejection opening line 22RCT for the reaction liquid, among the mask patterns for the ejection opening groups D1 to D16 corresponding to the first to the 16th scanning, the mask patterns for ejection opening groups D1 to D6 corresponding to the first to the 6th scanning have printable pixels. The mask patterns for other ejection opening groups D7 to D16 corresponding to the 7th to the 16th scanning do not have any printable pixel. Thus, the reaction liquid is ejected in the first to the 6th of the 16 times of scanning.

For the ejection opening line 22Em for the clear emulsion ink, among the mask patterns for the ejection opening groups E1 to E16 corresponding to the first to the 16th scanning, the mask patterns for ejection opening groups E11 to E16 corresponding to the 11th to the 16th scanning have printable pixels. The mask patterns for other ejection opening groups E1 to E10 corresponding to the first to the 10th scanning do not have any printable pixel. Thus, the clear emulsion ink is ejected in the 11th to 16th of the 16 times of scanning.

As just described, in the present embodiment, the reaction liquid is ejected in the first several times of scanning; then, the pigment inks (cyan ink and magenta ink) are ejected in the next several times of scanning; and the clear emulsion ink is ejected in the last several times of scanning.

More specifically, only the reaction liquid is ejected in the first to the 4th scanning. Then, in the 5th and the 6th scanning, the pigment inks and the reaction liquid are ejected. In the 7th to the 10th scanning, only the pigment inks are ejected. In the 11th and the 12th scanning, the pigment inks and the clear emulsion ink are ejected. Finally, in the 13th to the 16th scanning, only the clear emulsion ink is elected.

In the present embodiment, after the reaction ink is applied onto the printing medium to some extent, the pigment inks are applied. Therefore, on landing on the printing medium, the pigment inks come into contact with the reaction liquid, immediately starting to flocculate. Thus, bleeding of the pigment inks is reduced.

The clear emulsion ink is applied onto the printing medium after a time (for the 7th to the 10th scanning) has elapsed since the reaction liquid has been applied. Thus, when the clear emulsion ink is ejected, the reaction liquid has lost reactivity. Therefore, the clear emulsion ink does not flocculate.

Also, the clear emulsion ink is applied onto the printing medium after the pigment inks have been applied. Thus, even if the image has a large surface roughness after the pigment inks have been applied, the rough surface is overcoated with the polymer emulsion by finally applying the clear emulsion ink, and, thus, the glossiness of the image is increased.

From the above, when a poorly permeable printing medium is printed, the use of the mask patterns as shown in FIGS. 10A to 10D allows the inks to be ejected in a controlled order such that the reaction liquid is elected in the first several times of scanning, the pigment inks are subsequently ejected in the next several times of scanning, and the clear emulsion ink is ejected in the last several times of scanning. Thus, the resulting image has reduced bleeding and improved glossiness compared to those in the first embodiment.

In the present embodiment, the mask patterns shown in FIGS. 10A to 10D are used also for printing permeable printing media. When a permeable printing medium is printed, an LUT not allowing the ejection of the clear emulsion ink nor the reaction ink is used for color conversion, as described in the first embodiment. Even if the mask patterns shown in FIGS. 10A to 10D are used, therefore, only pigment inks are merely ejected in the 5th to the 12th scanning. Thus, permeable printing media is printed without using the clear emulsion ink nor the reaction ink, as in the first embodiment.

The mask patterns used for printing permeable printing media are not limited to those shown in FIGS. 10A to 10D, and any patterns may be used as long as they allow pigment inks to be ejected.

Although in the present embodiment, the reaction liquid and the pigment inks are ejected in the 5th and the 6th scanning, and the pigment inks and the clear emulsion ink are ejected in the 11th and the 12th scanning, other embodiments may be implemented.

FIG. 11A depicts mask patterns for a reaction liquid ejection opening line 22RCT, and FIG. 11B depicts mask patterns for a clear emulsion ink ejection opening line 22Em. For the pigment inks, the same mask patterns as shown in FIGS. 10A and 10B are used.

In this instance, when the mask patterns shown in FIGS. 10A, 10B, 11A, and 11B are used, only the reaction liquid is ejected in the first to the 4th scanning, only the pigment inks are then elected in the 5th to the 12th scanning, and only the clear emulsion ink is ejected in the 13th to the 16th scanning. This embodiment can also reduce bleeding and improve glossiness.

Third Embodiment

In the first and the second embodiment, printing media are classified into two types: permeable printing media which are printed with only the pigment inks; and poorly permeable printing media which are printed with the pigment inks, the reaction liquid, and the clear emulsion ink.

In contrast, in a third embodiment, the permeable printing media used in the first embodiment are further classified into two types depending on the permeability, and the poorly permeable printing media are further classified into three types. These printing media are printed according to the type thereof.

In the following description, the same description as in the first and the second embodiment will be omitted.

In the first embodiment, four of the eight types of printing media in the user interface shown in FIG. 7, PLAIN PAPER, GLOSSY PAPER, ART PAPER, and COATED PAPER, are determined to be permeable. However, art paper and coated paper are coated with a film and are less permeable than plain paper and glossy paper, as described in the first embodiment. Accordingly, it takes a long time for ink to permeate art paper or coated paper compared to plain paper or glossy paper. Thus, art paper and coated paper is more likely to cause bleeding.

In the present embodiment, accordingly, ART PAPER and COATED PAPER of the eight types of printing medium in the user interface shown in FIG. 7 are considered to be intermediately permeable, and printing thereon is controlled in a different manner from printing on permeable printing media (PLAIN PAPER and GLOSSY PAPER) and poorly permeable printing media (POLYVINYL CHLORIDE FILM, POLYVINYL CHLORIDE BANNER, PP FILM, and YUPO).

More specifically, in the present embodiment, the intermediately permeable printing media, that is, art paper and coated paper, are used for image quality-oriented printing rather than fastness-oriented printing (focused on fastness to water, light and rubbing). Therefore, the clear emulsion ink is not used to avoid reducing glossiness. However, since intermediately permeable printing media may cause bleeding as described above, the reaction liquid is elected in addition to the pigment inks to reduce bleeding. In this embodiment, when permeable printing media (plain paper and glossy paper) and poorly permeable printing media (polyvinyl chloride film, polyvinyl chloride banner, PP film, and Yupo) are printed, the same control as described in the first embodiment is applied.

Table 2 shows which inks are used for printing each type of printing medium and whether or not the respective printing media are heated with a heater.

TABLE 2

|  | Use the ink? | | | |
| --- | --- | --- | --- | --- |
|  | Pigment ink | Clear Em ink | Reaction liquid | Heater |
| Poorly permeable media | Yes | Yes | Yes | Used |
| Intermediately permeable media | Yes | No | Yes | Not used |
| Permeable media | Yes | No | No | Not used |

As is clear from the comparison between Tables 1 and 2, the combination of the inks and whether or not the printing media is heated with a heater, for the poorly permeable printing media and the permeable printing media are the same between the first embodiment and the present embodiment.

For the intermediately permeable printing media, pigment inks and the clear emulsion ink are used without using the clear emulsion ink, as described above. In this instance, since the clear emulsion ink is not used, heating for forming a film of the polymer emulsion is not necessary.

The present embodiment enables favorable printing on printing media such as art paper and coated paper that are used for printed articles focused on image quality rather than fastness to water, etc. and that are more likely to cause bleeding than plain paper or the like.

Other Embodiments

In the embodiments disclosed above, eight printing media in the user interface shown in FIG. 7 are classified into a plurality of types, and printing thereon is controlled according to the type thereof. In some embodiments, printing media other than the eight printing media may be printed with control according to the permeability in the same manner. Such embodiments can also produce the same effect as the disclosed embodiments. For example, cloth made of natural fiber, such as cotton, silk, or sheep wool, synthetic fiber, such as nylon, or composite fiber of two or more of these fibers is relatively poor in permeability and therefore often used for outdoor display, accordingly being required to be resistant to water, light and rubbing. If cloth is printed, it is beneficial that the cloth is classified as the poorly permeable printing media to be printed with the clear emulsion ink and the reaction liquid in addition to the pigment inks, and that the inks are heated so that the particles of the polymer emulsion melt to form a film for fixation.

Although the first embodiment discloses an implementation in which the clear emulsion ink and the reaction liquid are separately applied, another embodiment may be implemented in which an ink having both the functions of the clear emulsion ink and the reaction liquid, prepared by mixing the ingredients of the clear emulsion ink and the ingredients of the reaction liquid together is used with the pigment inks.

Although the first and the second embodiment use the reaction liquid to reduce bleeding for poorly permeable printing media, the reaction liquid may be unnecessary in an embodiment. In an embodiment, only the pigment inks and the clear emulsion ink may be used. In this instance, both the pigment inks and the clear emulsion ink are used for poorly permeable printing media, while only the pigment is used for permeable printing media without using the clear emulsion ink. This embodiment can produce the same effect as the first and the second embodiment.

The inks are applied in random order in the first embodiment, while the inks are applied in the order of the reaction liquid, the pigment inks, and the clear emulsion ink in the second embodiment. In an embodiment, these may be combined. For example, for high-speed printing, in which the number of times of scanning for a unit area is small, a larger amount of ink is ejected for one time of scanning. If the order of ink application is specified in this instance, the amount of ink ejected for one time of scanning increases. This may cause ink droplets to come into contact on the printing medium, resulting in bleeding. Accordingly, an embodiment in which a high-speed printing mode and a high image quality printing mode are available may be implemented in such a manner that inks to applied in the high image quality printing mode are ejected in a specific order as in the second embodiment, while inks to be applied in the high-speed printing mode are ejected without specifying the order of application as in the first embodiment.

Also, although in the disclosed embodiments, the combinations of inks to be used are switched according to user's orientation (fastness-oriented or image quality-oriented print) that is determined by the type of printing medium to be printed, other embodiments may be implemented. For example, in an embodiment, the user interface may have check boxes by which the user can directly select either fastness-oriented printing or image-quality oriented printing, and the combinations of inks to be used are switched according to the selection. Alternatively, the user interface may have check boxes for selecting either outdoor display-intended printing or indoor display-intended printing.

In each embodiment, it is beneficial that the pigment inks have a higher surface tension than the reaction liquid and the clear emulsion ink. More specifically, the pigment inks, in each embodiment, have a surface tension in the range of 27 dyn/cm to 30 dyn/cm, and the reaction liquid and the clear emulsion ink each have a surface tension in the range of 20 dyn/cm to 23 dyn/cm. When two liquids having different surface tensions come into contact with each other, in general, one having a higher surface tension attracts the other (Marangoni effect). Therefore, when the surface tensions of the inks are adjusted as above, the pigment inks having a higher surface tension do not move much from the point that have landed on. Thus, bleeding resulting from such ink movement can be reduced. The clear emulsion ink having a lower surface tension moves in such a manner that it flows into droplets of the pigment ink. Thus, the clear emulsion ink is more likely to coat the layer of the pigment ink, further improving the fastness to water, light and rubbing.

In general, the larger the difference in pKa, the higher the reaction speed. Since the pigment needs to react with the reactive component, it is beneficial that the difference in pKa between the anionic group of the water-soluble resin in the pigment ink and the reactive component is large. More specifically, the difference in pKa between the anionic group in the pigment ink and the reactive component may be 0.5 or more.

Although in the disclosed embodiments, the clear emulsion ink is not used for printing poorly permeable printing media, other embodiments may be implemented. For example, in an embodiment, the user may select whether or not to use the clear emulsion ink when a poorly permeable printing medium is printed. This embodiment enables user selection in terms of use of inks according to user's intention. For example, when an image quality-oriented print is formed on a poorly permeable printing medium, the user may select printing not using the clear emulsion ink, and when, a water fastness-oriented print, or the like, is formed on a poorly permeable printing media, the user may select printing using the clear emulsion ink. In this instance, when permeable printing media are printed, the user is not allowed to select whether or not to use the clear emulsion ink so that the clear emulsion ink is not used any time because permeable printing media are primarily not resistant to water or the like.

Although in the above embodiments, the reaction liquid and the clear emulsion ink do not contain a coloring material, these inks may contain a small amount of coloring material to the extent printed images are not affected in some embodiments. In the description disclosed herein, the expression "containing no coloring material", "containing substantially no coloring material", and similar expression imply that a small amount of coloring material may be contained to the extent the printed images are not affected.

Although in the disclosed embodiments, the idea disclosed herein is implemented in a printing apparatus and a printing method using the printing apparatus, the idea may be implemented in an image processing apparatus or method adapted to generate data used for the disclosed printing method. In an embodiment, a software program used for the printing method disclosed herein may be provided separately for the printing apparatus.

Also, the idea disclosed herein may be implemented effectively in many types of ink jet printing apparatus including thermal let type and piezoelectric ink jet type.

The printing medium used herein is not limited to a paper medium used in ordinary printing apparatuses, and may be cloth, a plastic film, a metal plate, or a medium of any other material that can receive ink, such as glass, ceramic, wood, or leather.

The printing apparatus disclosed herein can produce printed articles having both high image quality and fastness to water, light and rubbing.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-047300 filed Mar. 13, 2017, which is hereby incorporated by reference herein in its entirety.

What is claimed is:

1. A printing apparatus comprising:
an ink ejecting device configured to eject a plurality of inks having different functions onto any one of a plurality of types of printing medium, thereby printing the printing medium, the plurality of inks including a first ink containing a coloring material, and a second ink containing a polymer emulsion and substantially no coloring material, and the plurality of types of printing medium including a first printing medium and a second printing medium less permeable to liquid than the first printing medium;
an ink supplying device configured to supply the inks to the ink ejecting device; and
an information receiver configured to receive information on whether a printing medium to be printed is one of the first printing medium and the second printing medium,
wherein when the received information designates the first printing medium as the printing medium to be printed, the first ink is used without using the second ink during the printing of the first medium, and
wherein when the received information designates the second printing medium as the printing medium to be printed, both the first and the second ink are used during the printing of the second medium.

2. The printing apparatus according to claim 1, wherein the plurality of inks further include a third ink containing a reactive component reactive with the first ink, and
wherein when the second printing medium is printed, the third ink is further used.

3. The printing apparatus according to claim 2, wherein when the first printing medium is printed, the third ink is not used.

4. The printing apparatus according to claim 2, wherein the reactive component in the third ink is capable of flocculating or gelling the coloring material.

5. The printing apparatus according to claim 2, wherein the reactive component in the third ink is less reactive with the second ink than with the first ink.

6. The printing apparatus according to claim 2, wherein the plurality of type of printing medium further include a third printing medium less permeable to liquid than the first printing medium and more permeable to liquid than the second printing medium, and wherein when the third printing medium is printed, both the first and the third ink are used without using the second ink.

7. The printing apparatus according to claim 1, wherein the second ink further contains a reactive component reactive with the first ink.

8. The printing apparatus according to claim 1, wherein the polymer emulsion in the second ink forms a film when being heated.

9. The printing apparatus according to claim 8, the printing apparatus further comprising a heating device configured to heat the printing medium onto which an ink has been ejected, the heating device being not used when the first printing medium is printed and being used when the second printing medium is printed.

10. The printing apparatus according to claim 1, further comprising:
a mode selector configured to select a mode from a plurality of printing modes according to the received information; and
a controller configured to control the ejection of the inks from the ink ejecting device according to the selected printing mode,
wherein the plurality of printing modes includes a first printing mode allowing the second ink to be used and not allowing the first ink to be used, and a second printing mode allowing both the first and the second ink to be used, and
wherein when the received information designates the first printing medium as the printing medium to be printed, the mode selector selects the first printing mode, and when the received information designates the second printing medium as the printing medium to be printed, the mode selector selects the second printing mode.

11. The printing apparatus according to claim 10, wherein the information receiver receives information on the type of printing medium based on user input.

12. The printing apparatus according to claim 10, wherein the information receiver senses printing medium, determines the type of printing medium and receives information on the type of printing medium based on the determination thereof.

13. The printing apparatus according to claim 10, wherein the controller controls the ejection of the inks so that the ink ejecting device ejects the inks while scanning a unit area of the printing medium a plurality of times, and so that the proportion of the first ink ejected to the unit area is higher than the proportion of the second ink ejected to the unit area in an earlier time of the plurality of times of scanning.

14. The printing apparatus according to claim 13, wherein the controller controls the ejection of the inks so that the second ink is not ejected before a predetermined time of the plurality of times of scanning and the first ink is not ejected after the predetermined time.

15. The printing apparatus according to claim 1, wherein the first ink has a surface tension higher than the second ink.

16. The printing apparatus according to claim 1, wherein the ink absorption of the first printing medium until 30 msec$^{1/2}$ has elapsed after an ink has been applied is 10 mL·m$^{-2}$ or more when measured by Bristow's method, and the ink absorption of the second printing medium until 30 msec$^{1/2}$ has elapsed after an ink has been applied is less than 10 mL·m$^{-2}$ when measured by Bristow's method.

17. The printing apparatus according to claim 16, wherein the first printing medium is one of plain paper and glossy paper, and the second printing medium includes a substrate having no ink-receiving layer.

18. The printing apparatus according to claim 17, wherein the second printing medium includes a polyvinyl chloride layer.

19. A printing apparatus comprising:
an ink ejecting device configured to eject a plurality of inks having different functions onto any one of a plurality of types of printing medium, thereby printing the printing medium, the plurality of inks including a first ink containing a coloring material, and a second ink containing a polymer emulsion and substantially no coloring material, and the plurality of types of printing medium including a first printing medium and a second printing medium less permeable to liquid than the first printing medium;
an ink supplying device configured to supply the inks to the ink ejecting device; and
an information receiver configured to receive information on whether an image quality-oriented printed article is to be produced or a printed article oriented to fastness to water, light and rubbing is to be produced,
wherein when the received information designates that the image quality-oriented printed article is to be produced, the first ink is used without using the second ink during the production of the image quality-oriented printed article, and
wherein when the received information designates that the printed article oriented to fastness to water, light and rubbing is to be produced, both the first and the second ink are used during the production of the printed article oriented to fastness to water, light and rubbing.

20. A printing apparatus comprising:
an ink ejecting device configured to eject a plurality of inks having different functions onto any one of a plurality of types of printing medium, thereby printing the printing medium, the plurality of inks including a first ink containing a coloring material, and a second ink containing a polymer emulsion and substantially no coloring material, and the plurality of types of printing medium including a first printing medium and a second printing medium less permeable to liquid than the first printing medium; and
an ink supplying device configured to supply the inks to the ink ejecting device; and
an information receiver configured to receive information on whether a printed article for indoor display is to be produced or a printed article for outdoor display is to be produced,
wherein when the received information designates that the printed article for indoor display is to be produced, the first ink is used without using the second ink during the production of the printed article for indoor display, and
wherein when the received information designates that the printed article for outdoor display is to be produced, both the first and the second ink are used during the production of the printed article for outdoor display.

21. A printing method comprising:
receiving information on whether a printing medium to be printed is one of a first printing medium and a second printing medium, the second printing medium being less permeable to liquid than the first printing medium; and
ejecting at least one of a plurality of inks having different functions onto any one of the first printing medium and the second printing medium based on the received information, thereby printing the printing medium, the plurality of inks including a first ink containing a coloring material, and a second ink containing a polymer emulsion and substantially no coloring material, wherein when the first printing medium is printed based on the received information, the first ink is used without using the second ink, and wherein when the second printing medium is printed based on the received information, both the first and the second ink are used.

* * * * *